April 26, 1932.  J. F. MacINDOE  1,855,748
HIGH PRESSURE GREASE FITTING
Original Filed July 7, 1927
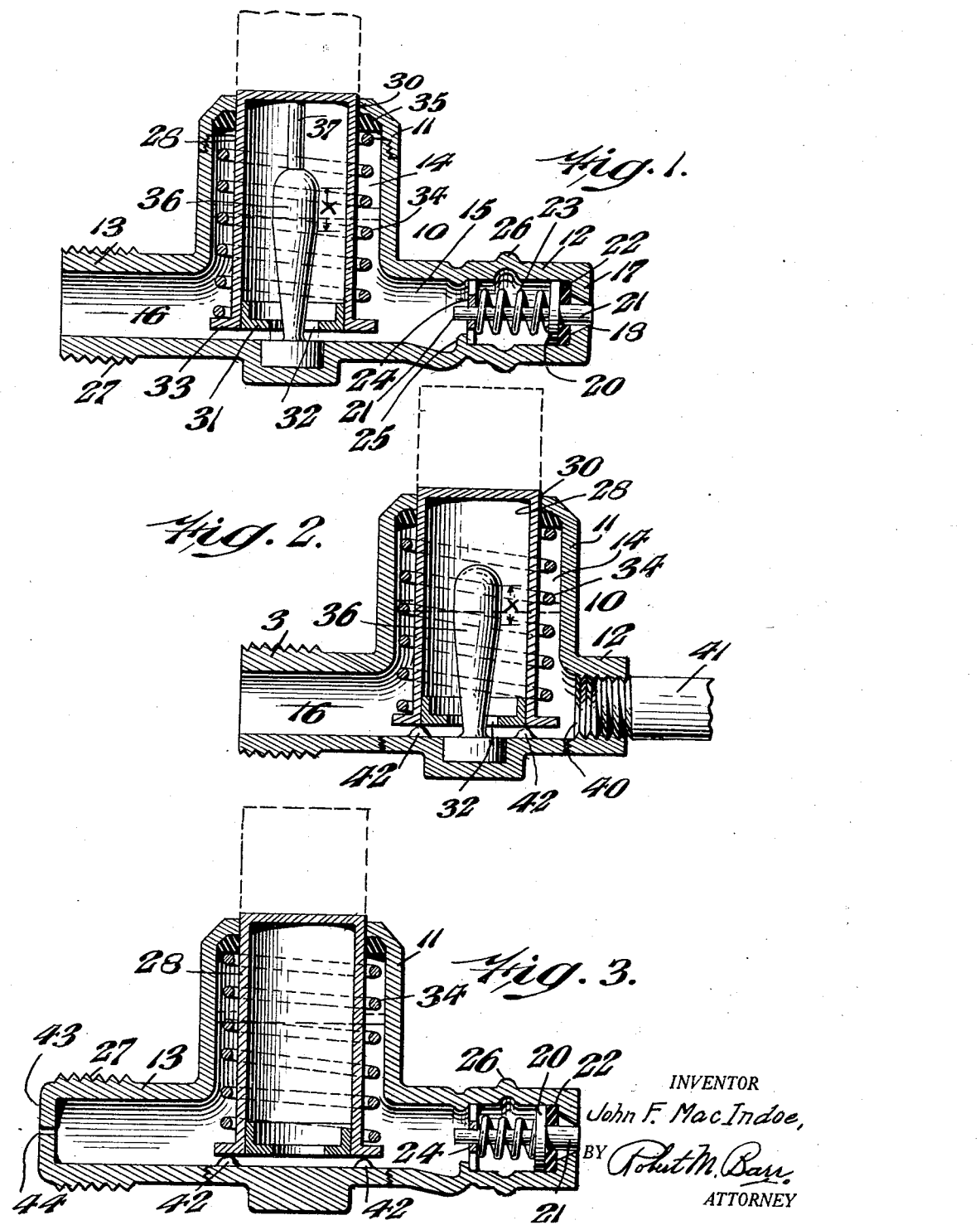
INVENTOR
John F. MacIndoe,
BY Robert M. Barr.
ATTORNEY Patented Apr. 26, 1932

1,855,748

UNITED STATES PATENT OFFICE

JOHN FRANKLIN MacINDOE, OF PHILADELPHIA, PENNSYLVANIA

HIGH PRESSURE GREASE FITTING

Application filed July 7, 1927, Serial No. 204,093. Renewed February 26, 1931.

The present invention relates to lubricating devices, and more particularly to an automatic lubrication supply fitting.

In fittings for supplying lubrication under pressure to bearings it is more or less common practice at the present time to permanently attach check valve type of nipples to bearings whereby a pressure grease gun can be quickly attached to the nipple and inject a shot of grease to the bearing to maintain it in running condition for some period of operation. This supply of grease is delivered under pressure when the shaft or other moving part is at rest in its bearing, and it has been found that approximately one-third of the bearing, generally known as the "dead spot", does not receive any lubrication because the weight-supporting portion of the bearing does not give any clearance for the admission of the grease.

Some of the objects of the present invention are to overcome the foregoing disadvantages and provide complete lubrication to all parts of the bearing; to provide a lubrication supply fitting which functions automatically to supply a charge of grease after the shaft or other part is in motion; to provide a fitting which ensures the so called "dead spot" of a bearing being supplied with lubricant; to provide a fitting by which the lubricant is supplied in quantity proportioned to the expelling pressure; to provide a bearing fitting whereby after a shot of lubricant has been introduced into the bearing there will be an automatic additional film of grease discharged to compensate for that which depletes the original shot after the movable part is in motion; and to provide other improvements as will hereinafter appear.

In the accompanying drawings Fig. 1 represents a sectional elevation of a lubricant fitting embodying one form of the present invention; Fig. 2 represents a similar section of a modified form of the invention; and Fig. 3 represents a like section showing still another form of the invention.

Referring to the drawings, one form of the present invention consists of a fitting 10 formed as a tubular head 11 having two oppositely disposed extensions 12 and 13. The head 11 forms a chamber 14 which is in communication with an inlet passage 15 in the extension 12 and with an outlet passage 16 in the extension 13. The end of the extension 12 is spun over to provide an end closure 17 having an inlet 18 which is inwardly flared to direct the grease readily into the passage 15. This inlet 18 is arranged to be controlled by a check valve in the form of a disc 20 fastened to a stem 21 which extends into the opening 18 and is of substantially the same diameter in order to prevent dirt and dust from entering the inlet 18. The seating face of the valve disc 20 is formed by composition washer 22 and this is normally held seated against the inner wall of the end 17 by a coil spring 23 interposed between the disc 20 and a spider 24 which seats against a projecting abutment 25 on the extension 12. This spider 24, in addition to holding the spring 23 under compression, serves as a guide for the rear end of the stem 21. The extension 12 is arranged to receive the connecting fitting of a grease gun or other lubricant supply source, and in order to secure this part to the extension 12 the latter is provided with a bead or catch 26 for cooperation with a part of the fitting. The extension 13 which forms the discharge passage 16 is preferably exteriorly threaded, as shown at 27, for permanent threaded engagement with a bearing or other part to which the lubricant is to be supplied.

For the purpose of supplying an auxiliary film of oil to the bearing after the pressure gun or other lubricant supply means has been detached, the chamber 14 receives a hollow plunger 28 which is mounted for sliding movement in an opening 30 in the end of the head 11, and the closed end of the plunger 28 passes through the opening 30 while the opposite or open end has communication with the chamber 14. This open end of the plunger 28 seats a grease control nozzle 31 which has an auxiliary opening 32 for the passage of grease to and from the interior of the plunger 28. Also this end of the plunger is provided with a laterally disposed circumferential flange 33 forming a seat for one end of a coil spring 34, the other end of which is seated against a packing ring 35 at the end of the head 11 and sealing the sliding joint of the opening 30.

In order to regulate and proportion the discharge of grease from the hollow movable plunger 28 a grease displacement member 36 is provided which is fixedly attached to the fitting 10 in axial alignment with the nozzle opening 32 so that as the plunger 28 moves in one direction the displacement member projects through the opening 32 and while moving in the opposite direction the displacement member is telescoped within the plunger. It should be noted that the end of the displacement member contained within the plunger 28 is of uniform diameter for a distance indicated by X and then tapers with diminishing diameter to a point outside of the plunger 28, and hence the movement of the plunger upon a discharging stroke forces the same amount of lubricant through the opening 32 for a certain length of its stroke, and thereafter, when the tapered portion of the displacement member comes into action, there is a gradual increase in the amount of lubricant discharged from the plunger 28. It will thus be evident that the displacement member 36 has its end of larger diameter projecting into the plunger 28 while the tapered portion converges to its smallest diameter exterior of the plunger 28. While the member 36 has been described as a displacement member it in effect is a control or compensating member having a distinct relation to the action of the spring 34 in that the decreased area encircling the large end of the member 36 serves to retard the descent of the plunger 28 during the strongest part of the spring expansion. When the spring has weakened an appreciable amount the tapered portion of the member 36 begins its control action and reduces the resistance to compensate for the weakening of the spring through the remaining portion of the stroke. The uniform discharge portion is approximately one-fourth of the stroke of the plunger 28, since it has been found that there is substantially no variation in the pressure of the spring during this initial portion of the stroke, but thereafter, as the spring weakens, the tapering portion of the displacement member compensates for the weakening of the spring and allows a proportionate amount of lubricant to be discharged from the opening 32 into the passage 16. In this instance the displacement member has an end stem 37, which limits the inward movement of the plunger 28, as will be understood.

In the form of the invention shown in Fig. 2, the extension part 12 is interiorly threaded, as shown at 40, to receive any type of connecting nipple 41 instead of the built-in type of check valve, and the general operation and function is the same. In this form also the displacement member 36 has no extension to act as a limit stop for the plunger, and in place thereof the bottom of the passage 16 is provided with upstanding lugs 42 which serve to limit the inward movement of the plunger 28 and allow the incoming grease to pass beneath it and enter the opening 32 to fill the plunger 28.

In Fig. 3 a form of the invention is shown for use where compensation and proportioning of discharge is not essential, and to that end the extension 13 is provided with a closed end 43 having a relatively small port 44 through which grease is forced to the bearing. In this instance the hollow plunger 28 serves to force the lubricant to the discharge outlet 44 without the interposition of any control means such as the displacement member 36 shown in the other figures.

Generally considered, the operation of the several forms of the invention is the same, the specific difference being that in some cases regulation takes place in proportion to operating pressure as distinguished from a continuous feed without such regulation. With a pressure filling gun or other supply medium attached to the inlet end of the fitting, grease is introduced into the body of the fitting causing the plunger 28 to be filled with grease and forced outward to its full indicating position. This filling action also causes grease to be discharged to the bearing to form an initial film in the clearance not in the area of the dead part. The gun or other supplying device is then removed and the fitting is ready to carry out its function of continuous supply to the bearing as needed by running conditions. The first effect of the movement of the moving part in the bearing is to cause a clearance space where the dead spot existed and instead of robbing the film of lubricant already in the bearing this space is automatically filled by the pressure action of the spring 34 upon the piston 28. The result is an additional film of lubricant is automatically supplied to the bearing at the moment it is needed and this as well as the initial film, are thereafter maintained constant during the movement of the part in bearing. In the proportionate regulation type of fitting a fixed outlet area is held for the required part of the stroke to absorb the excess spring pressure at the first part of the plunger stroke, and thereafter a proportioning of the supply takes place with respect to the weakening of the spring.

What I claim as new and useful is:

1. A lubricant fitting comprising a part arranged to be connected to a bearing and providing a lubricant passage having an inlet and an outlet, a check valve located to control said inlet, means including a spring pressed plunger for automatically discharging lubricant from said passage outlet when said check valve is closed, and a control member fixed to said part having an end of uniform diameter projecting into said plunger and a tapered end passing through its outlet whereby the spring pressure on said plunger is automatically compensated throughout the movement of said plunger.

2. A lubricant fitting comprising a tubular head having two lateral extensions forming a through passage for lubricant in communication with the interior of said head, one of said extensions having an inlet and the other having an outlet, a check valve for controlling said inlet, said head having its closed end substantially parallel with said passage and provided with an opening, a tubular plunger slidably mounted in said opening and having its outer end closed and its inner end provided with an opening forming a communication between the interior of said plunger and said passage, a spring encircling said plunger and normally forcing said plunger toward said passage, a tapered control member passing through said plunger opening and terminating in a head of enlarged uniform diameter, and means to provide a clearance space between the inner end of said plunger and the wall of said passage in the innermost position of said plunger to provide for the admission of lubricant under pressure from said passage to the interior of said plunger whereby said spring is placed under compression to force lubricant through said outlet when said check valve is closed.

3. A lubricant fitting comprising a tubular head and two laterally disposed extensions forming a lubricant passage through said fitting and communicating with said head, one of said extensions having an inlet and the other having an outlet, a spring pressed plunger slidable through the end of said head and normally projected in a direction transversely of said passage, said plunger having an outer closed end and an inner end provided with an opening to establish communication between the inside of said plunger and said passage, and a control member fixed to said casing and projecting into said plunger, said member having a head of enlarged uniform diameter within said plunger and a downward converging tapered portion terminating outside of said plunger whereby said plunger causes the lubricant to be discharged uniformly under spring pressure.

Signed at Philadelphia, county of Philadelphia, State of Pennsylvania, this 5th day of July, 1927.

JOHN FRANKLIN MacINDOE.